(12) United States Patent
Bauchot et al.

(10) Patent No.: US 10,387,558 B2
(45) Date of Patent: Aug. 20, 2019

(54) PROVISION OF A SEPARATE INPUT INTERFACE FOR USER INTERACTION WITH A SPREADSHEET

(71) Applicant: INTERNATIONAL BUSINESS MACHINES CORPORATION, Armonk, NY (US)

(72) Inventors: Frederic Bauchot, Saint-Jeannet (FR); Georges-Henri Moll, Villeneuve-Loubet (FR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 44 days.

(21) Appl. No.: 15/050,939

(22) Filed: Feb. 23, 2016

(65) Prior Publication Data
US 2017/0242837 A1    Aug. 24, 2017

(51) Int. Cl.
G06F 17/24    (2006.01)

(52) U.S. Cl.
CPC .................. *G06F 17/246* (2013.01)

(58) Field of Classification Search
CPC .... G06F 17/26; G06F 17/2235; G06F 17/246; G06F 17/247; G06F 17/24; G06F 17/243
See application file for complete search history.

(56) References Cited

U.S. PATENT DOCUMENTS

| | | | | |
|---|---|---|---|---|
| 5,685,001 A | * | 11/1997 | Capson | G06F 17/246 715/212 |
| 5,926,822 A | * | 7/1999 | Garman | G06F 17/246 715/201 |
| 6,157,934 A | * | 12/2000 | Khan | G06Q 10/10 709/203 |
| 6,438,565 B1 | * | 8/2002 | Ammirato | G06F 3/0489 715/204 |
| 7,080,325 B2 | | 7/2006 | Treibach-Heck et al. | |
| 7,231,596 B2 | * | 6/2007 | Koren | G06F 17/30893 707/E17.12 |

(Continued)

FOREIGN PATENT DOCUMENTS

WO    2006130612 A2    12/2006

OTHER PUBLICATIONS

"User Interface for a Spreadsheet Program", ip.com, Apr. 1, 1997.

*Primary Examiner* — Thu V Huynh
(74) *Attorney, Agent, or Firm* — Michael O'Keefe; Matthew M. Hulihan; Heslin Rothenberg Farley & Mesiti PC

(57) ABSTRACT

Facilitating interaction with a spreadsheet it provided. One or more input cells of a spreadsheet displayed on a display device of a computer system are automatically detected. One or more candidate cells of the spreadsheet are presented for selection, as candidates for inclusion in an interface for display on the display device in conjunction with the spreadsheet, the one or more candidate cells including the detected one or more input cells. Based on a selection of at least one cell, of the one or more candidate cells, for inclusion in the interface, the selected at least one cell is displayed in the interface, where the selected at least one cell includes at least one input cell of the one or more candidate input cells.

17 Claims, 8 Drawing Sheets

(56) References Cited

U.S. PATENT DOCUMENTS

| | | | | |
|---|---|---|---|---|
| 7,444,584 B1* | 10/2008 | Hobbs | G06F 17/246 | 715/212 |
| 7,984,371 B2* | 7/2011 | Zdenek | G06F 17/215 | 707/778 |
| 8,185,817 B2 | 5/2012 | Collie et al. | | |
| 8,321,780 B2 | 11/2012 | Erwig et al. | | |
| 2002/0007380 A1* | 1/2002 | Bauchot | G06F 17/246 | 715/212 |
| 2002/0036662 A1* | 3/2002 | Gauthier | G06F 17/246 | 715/835 |
| 2002/0091728 A1* | 7/2002 | Kjaer | G06F 17/246 | 715/212 |
| 2003/0169295 A1* | 9/2003 | Becerra, Jr. | G06F 3/0481 | 715/765 |
| 2004/0103366 A1* | 5/2004 | Peyton-Jones | G06F 17/246 | 715/213 |
| 2005/0125377 A1* | 6/2005 | Kotler | G06F 17/245 | |
| 2006/0075328 A1* | 4/2006 | Becker | G06F 17/246 | 715/213 |
| 2006/0218483 A1* | 9/2006 | Weitzman | G06F 17/246 | 715/212 |
| 2007/0028158 A1* | 2/2007 | Djorovich | G06F 17/30395 | 715/202 |
| 2007/0220415 A1* | 9/2007 | Cheng | G06F 15/00 | 715/212 |
| 2008/0028288 A1* | 1/2008 | Vayssiere | G06F 17/246 | 715/219 |
| 2009/0089653 A1* | 4/2009 | Campbell | G06F 17/243 | 715/209 |
| 2011/0167330 A1* | 7/2011 | Folting | G06F 17/30489 | 715/219 |
| 2012/0166927 A1* | 6/2012 | Shearer | G06F 17/246 | 715/212 |
| 2013/0061122 A1* | 3/2013 | Sethi | G06F 3/0482 | 715/217 |
| 2014/0108902 A1* | 4/2014 | Brissette | G06F 17/2235 | 715/206 |
| 2014/0372858 A1* | 12/2014 | Campbell | G06F 17/246 | 715/220 |
| 2015/0169531 A1* | 6/2015 | Campbell | G06F 17/246 | 715/212 |
| 2017/0124740 A1* | 5/2017 | Campbell | G06F 3/04847 | |

* cited by examiner

FIG. 1A

PROVISION OF A SEPARATE INPUT INTERFACE FOR USER INTERACTION WITH A SPREADSHEET

BACKGROUND

Spreadsheets are very often used for preforming simulations. Simulations typically involve a user iteratively changing input cells in order to see the effects of calculated cells or the effects on charts or other outputs of the simulation. The calculations involved in a simulation can be complex and use possibly many intermediate calculation cells. As a result, simulation spreadsheets are often very large and require that the user scroll around to different cell areas in order to manipulate cells and/or view results.

SUMMARY

Shortcomings of the prior art are overcome and additional advantages are provided through the provision of a computer program product including a computer readable storage medium readable by a processor and storing instructions for execution by the processor for performing a method that includes automatically detecting one or more input cells of a spreadsheet displayed on a display device of a computer system; presenting for selection one or more candidate cells of the spreadsheet as candidates for inclusion in an interface for display on the display device in conjunction with the spreadsheet, the one or more candidate cells comprising the detected one or more input cells; and based on a selection of at least one cell, of the one or more candidate cells, for inclusion in the interface, displaying the selected at least one cell in the interface, wherein the selected at least one cell comprises at least one input cell of the one or more candidate input cells.

Further, a computer-implemented method is provided that includes: automatically detecting one or more input cells of a spreadsheet displayed on a display device of a computer system; presenting for selection one or more candidate cells of the spreadsheet as candidates for inclusion in an interface for display on the display device in conjunction with the spreadsheet, the one or more candidate cells comprising the detected one or more input cells; and based on a selection of at least one cell, of the one or more candidate cells, for inclusion in the interface, displaying the selected at least one cell in the interface, wherein the selected at least one cell comprises at least one input cell of the one or more candidate input cells.

Yet further, a computer system is provided that includes a memory and a processor in communications with the memory, wherein the computer system is configured to perform a method including: automatically detecting one or more input cells of a spreadsheet displayed on a display device of a computer system; presenting for selection one or more candidate cells of the spreadsheet as candidates for inclusion in an interface for display on the display device in conjunction with the spreadsheet, the one or more candidate cells comprising the detected one or more input cells; and based on a selection of at least one cell, of the one or more candidate cells, for inclusion in the interface, displaying the selected at least one cell in the interface, wherein the selected at least one cell comprises at least one input cell of the one or more candidate input cells.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 1A and 1B depict an example spreadsheet with which a simulation is performed;

DETAILED DESCRIPTION

Aspects described herein facilitate interaction with a spreadsheet by detecting and consolidating relevant cells of a spreadsheet into an added interface that is presented to the user and may persist regardless of which portion of the spreadsheet is currently displayed. This enables a user to use the interface to interact with (edit, view, etc.) cells that may be dispersed in different areas of a relatively large spreadsheet, without having to separately navigate throughout the spreadsheet and find those cells. This is useful for many applications, an example of which is spreadsheet-based simulation where the spreadsheet is very large, causing navigation therethrough to be tedious.

In spreadsheet-based simulation, the user often has to browse through the spreadsheet document in order to go back and forth from input cell(s) to calculated cell(s) or charts built based on those changing inputs. Both input and calculated cells/charts can be spread over one or many tabs in the spreadsheet document, making navigation tedious and time-consuming, especially in the highly iterative process of simulation.

Figure 1A:
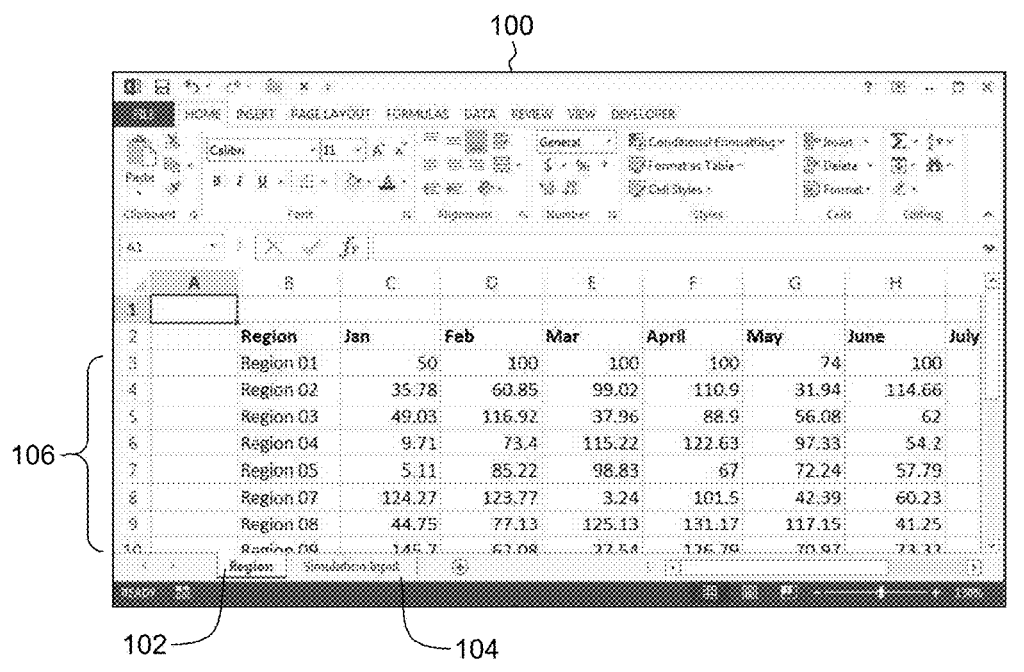
Figure 1B:
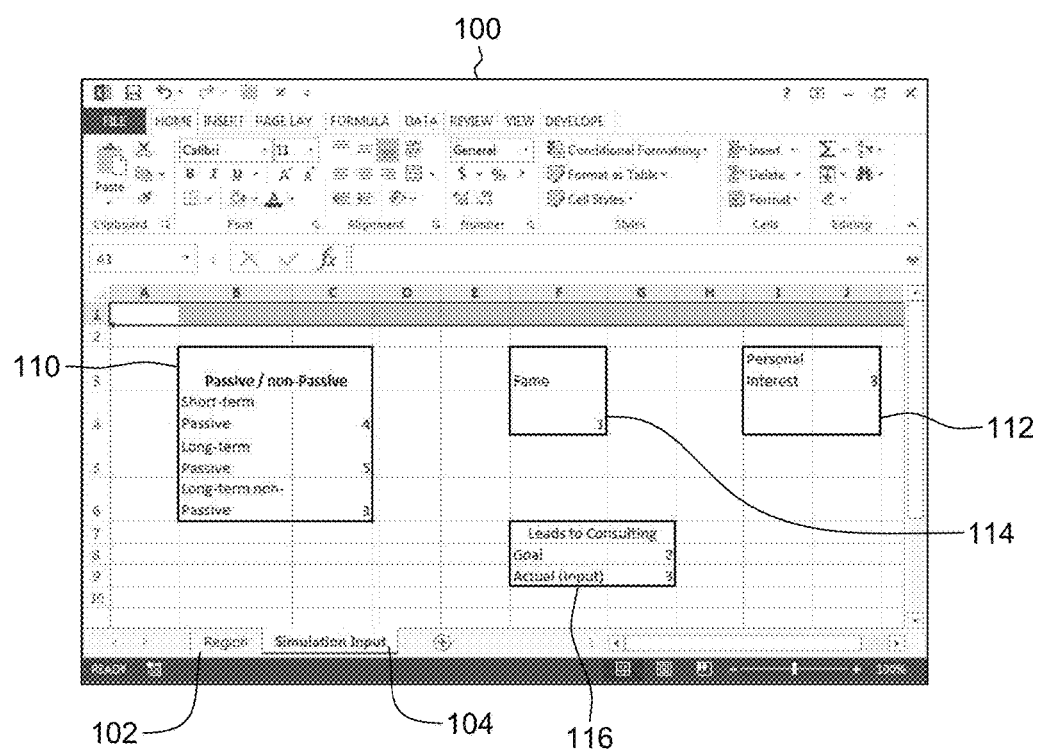

FIGS. 1A and 1B depict a basic example spreadsheet with which a simulation is performed. The spreadsheet 100 includes two sheets—one sheet 102 labeled Region and another sheet 104 labeled Simulation Input. As seen in FIG. 1A, Region sheet 102 displays various data 106 by month for various Regions (Region 01, . . . , Region 09). These numbers may be calculated based at least in part on input(s) from Simulation Input sheet 104. Based on the current view of the spreadsheet, not all data for all Regions and months are visible.

FIG. 1B shows the Simulation Input sheet 104 of spreadsheet 100. There are several input areas containing input cells and context cells. Input area 110 accepts Passive/non-Passive simulation input. Short-term Passive input is input into input cell C4. Cell B4 contains the phrase "Short-term Passive" indicating context for the Short-term Passive input in cell C4. Therefore, cell B4 is a context cell that corresponds to input cell C4.

Similarly, Long-term Passive input is input into input cell C5. Cell B5 contains the phrase "Long-term Passive" indicating context for the Long-term Passive input in cell C5. Therefore, cell B5 is a context cell that corresponds to input cell C5. Likewise, Long-term non-Passive input is input into input cell C6. Cell B6 contains the phrase "Long-term non-Passive" indicating context for the Long-term non-Passive input in cell C6. Therefore, cell B6 is a context cell that corresponds to input cell C6.

Cell B3 is also a context cell corresponding to input cells C4-C6, because cell B3 indicates the Passive/non-Passive input area generally. Hence, there may be several context cells that correspond to a given input cell, providing context at different levels of granularity. Cell B4, B5, and B6 provide context at a finer level of granularity than does cell B3 in this example.

Other input areas include Personal Interest input area 112 having context cell I3 and corresponding input cell J3, Fame input area 114 having context cell F3 and corresponding input cell F4, and Leads to Consulting input area 116 having context cells F8 ("Goal") and F9 ("Actual (input)") and corresponding input cells G8 and G9, as well as context cell F7 ("Leads to Consulting").

The Region sheet 102 in the example of FIGS. 1A and 1B contains calculated cells that are calculated based at least in part on inputs of the Simulation Input sheet 104. In performing a simulation, the user may adjust one or more input cells of Simulation Input 104, and may, after each adjustment, wish to view the effect on data in the Region sheet 102. This would mean the user has to iteratively: (i) adjust one or more inputs, (ii) switch to the Region sheet 102, (iii) observe the change(s), then (iv) go back to the Simulation Input sheet 104 for further adjustments. Meanwhile, the user may need to scroll around on each sheet in order to view the results or input. This may be problematic, tedious, time-consuming, confusing, and error-prone. The example of FIGS. 1A and 1B is relatively basic; many simulation spreadsheets are much more complex, including hundreds or thousands of relevant cells spanning large cell ranges.

Aspects described herein identify input and output zones (cells and/or areas of cells) of the spreadsheet, for instance by examining a dependency graph and cell context, and build a custom, additional interface that can be made to float and persist in the spreadsheet display. Aspects can detect, automatically in some examples, candidate input cells and context cells corresponding to those input cells for inclusion in the additional interface. A user may additionally or alternatively select relevant input and/or context cells, either from the automatically detected candidate cells or by specifying specific cells of the spreadsheet that were not initially detected. Then, aspects can display the pertinent cells in an additional interface that may be an always-on-top (floating) interface/window. The cells displayed in that interface may be selected from multiple different tabs or sheets, and may be editable, which edits are carried to the corresponding underlying cells of the spreadsheet to effect changes directly from that additional interface.

Example spreadsheet applications with which aspects described herein may function include Lotus® 1-2-3 (developed by International Business Machines Corporation; LOTUS is a trademark of International Business Machines Corporation, Armonk, N.Y., U.S.A.), Excel® (developed by Microsoft Corporation; EXCEL is a trademark of Microsoft Corporation, Redmond, Wash., U.S.A.), Apache OpenOffice™ Calc (developed by Oracle Corporation; Apache OpenOffice may be a trademark of The Apache Software Foundation Corporation, Forest Hill, Md., U.S.A.), and FreeOffice PlanMaker (developed by SoftMaker Software GmbH, Nuremberg, Germany), though aspects described herein may function with other spreadsheet applications as well.

Figure 2:
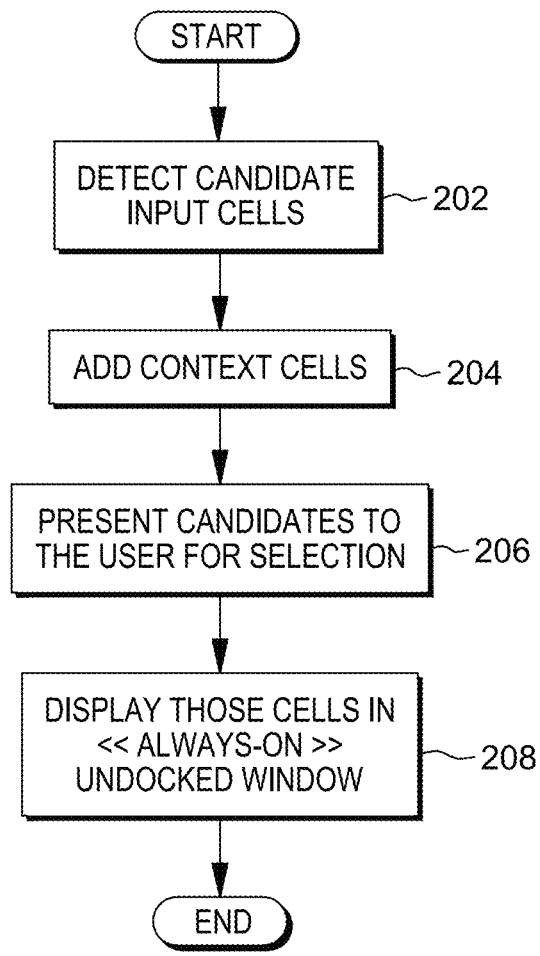
FIG. 2 depicts an example process for providing an additional interface to facilitate spreadsheet navigation, in accordance with aspects described herein.

FIG. 2 depicts an example process for providing an additional interface to facilitate spreadsheet navigation, in accordance with aspects described herein. The process is performed by (i) a computer system executing the spreadsheet application, (ii) another computer system in communication with the computer system executing the spreadsheet application, for instance as part of a client/server relationship, or (iii) a combination of (i) and (ii), as examples.

The process of FIG. 2 begins by detecting candidate input cell(s) (202). Spreadsheet applications maintain a dependency graph representing dependencies between spreadsheet cells. The dependency graph is a common spreadsheet construct enabling them to perform calculations smoothly. The dependency graph can be examined by, as examples, leveraging an API if provided by the developer of the spreadsheet or hooking into the source code of the spreadsheet application, in order to gain access to the dependency graph. Candidate input cells may be the «sources» in the dependency graph, identified based on those cells being used by other cells for calculation. Input cells do not depend on other cells to be calculated; they are «self-contained» constants or formulas.

The process continues by adding context cells (204). Context cells are automatically identified in some examples. As an example, the context cells may be identified as being (i) any immediate neighbors (up, down, right, left) to one or more input cells, (ii) not in the dependency graph (singletons), and (iii) containing only text data. As described above, context cells are intended to provide context for the other cells (input cells), and may be provided with those input cells in the additional interface to provide context to the user utilizing that additional interface. Using the example of FIG. 1B, the process might identify cell F4 as an input cell and cell F3 as the corresponding context cell. If cell F4 were presented by itself in the additional interface, the user would not have context for that "1". The corresponding context cell (F3—"Fame" in this example) provides an explanation as to what that parameter "1" is.

At (206), the process presents the candidates (i.e. those cells detected at 202 and 204) to the user for confirmation/selection for inclusion in the additional interface to be added. The candidates may be presented in a spreadsheet-like separate window, allowing the user to multiple select (using appropriate keystrokes, such as the CTRL key) the relevant input and context cells that the user desires to be presented in the additional interface. This allows the user to prune candidate cells that the user does not have a use for, for instance any input cells that are constants not to be adjusted, or misidentified context cells.

The selection interface may also enable the user to separately-specify cell(s) that were not identified and presented as candidate input or context cells and/or reassign context cells corresponding to input cell(s). For instance, if the context cell detection algorithm were not configured to look beyond immediate neighbors of the input cells, it may not identify cell F7 in FIG. 1B as being a context cell corresponding to input cell G9. In the particular example of FIG. 1B, the Leads to Consulting input area houses inputs for "Goal" and "Actual (input)". The Goal in this example is an input that serves primarily as an informational item to inform the user of the goal for the Leads to Consulting. It is the "Actual (input)" that the user will desire to change in the simulation with respect to the Leads to Consulting. However, the immediately neighboring context cell F9 ("Actual (input)") may not provide enough context for the user to identify input cell G9 as corresponding to Leads to Consulting. Therefore, the user may desire to provide cell F7 ("Leads to Consulting") as the context cell corresponding to input cell G9, or may wish to provide both cells F7 and F9 as two context cells corresponding to input cell G9. The selection interface can allow the user to add cell F7 as a context cell for cell G9 in this case. This selection interface can optionally enable the user to rearrange cells to be presented in the additional interface.

In another example, there may be multiple possible context cells detected for an input cell, in which case the selection window enables the user to specify which of those identified context cell(s) are to be used as the context cell(s) for the input cell.

In this manner, the selection interface gives the user the final say as to which cells are to be presented in the additional interface. It should be understood that the algorithm(s) for identifying candidate input and context cells for inclusion may be tweaked according the preferences of the users in order to more accurately automatically identify the relevant candidates for inclusion.

Once the selection of the cells to present in the interface is made, either entirely automatically or with assistance from the user, the process continues by displaying those cells in an «always-on-top» undocked interface/window (208). The interface/window may editing to, e.g. enable the user to modify input cell(s) via that additional interface regardless of what tab and area of the spreadsheet is currently navigated-to and displayed. Thus, the user can change data of an input cell via that additional interface, rather than by navigating to the input cell in the spreadsheet and making the change. In this regard, cells presented in the additional interface can be linked to the underlying corresponding cells in the spreadsheet such that a change to a cell in the interface or in the spreadsheet is reflected in its counterpart, though some cells in the interface, such as calculated cells, may be protected from editing.

The interface may be floating undocked on top of the underlying sheet. In some embodiments, the user can dock the additional interface, for instance along a side of the spreadsheet or application window.

Figure 3:
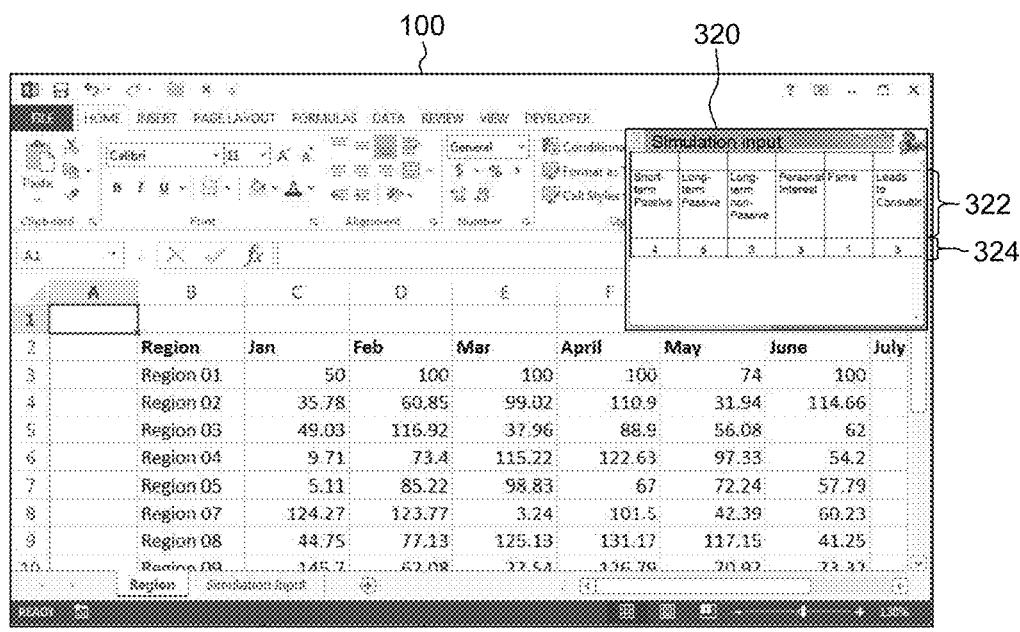
FIG. 3 depicts an example in which a floating interface is provided for a spreadsheet to facilitate provision of simulation input into the spreadsheet, in accordance with aspects described herein.

FIG. 3 depicts an example in which a floating interface is provided for a spreadsheet to facilitate provision of simulation input into the spreadsheet, in accordance with aspects described herein. In FIG. 3, spreadsheet 100 is again presented with the Region sheet being active. Interface 320 labeled "Simulation input" is shown hovering above the Region sheet. In some examples, the interface 320 is provided as a separate window from the window in which the spreadsheet resides. In other examples, the interface 320 is a movable window that is contained within the window in which the spreadsheet resides.

Interface 320 shows a row 322 of context cells and a row 324 of input cells. Each context cell in row 322 corresponds to the input cell immediately beneath, providing context for the user to identify the particular input to which the corresponding input cell corresponds.

Figure 4:
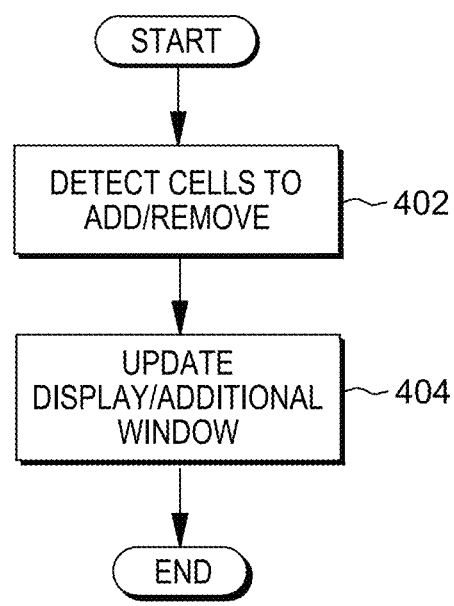
FIG. 4 depicts an example process for modifying an additional interface described herein based on one or more changed dependencies of a spreadsheet, in accordance with aspects described herein.

Aspects of the process of FIG. 2 can incrementally apply each time the dependency graph of the spreadsheet changes. Event-based detection of a dependency graph change thereby drives a potential modification to the additional interface. Typically, an add or drop/remove of an input cell in the dependency graph will lead to an addition or deletion, as the case may be, of the input cell and corresponding context cell(s) to/from the additional interface. FIG. 4 depicts an example process for modifying an additional interface described herein based on one or more changed dependencies of a spreadsheet, in accordance with aspects described herein. The process begins based on detecting a change in the dependency graph. The process initially detects cell(s) to add or remove from the additional interface (402). In the case where the dependency graph is modified such that a previous input cell is no longer an input cell, the detecting (402) will detect that input cell for removal from the additional interface, if currently presented therein. In the case where the dependency graph is modified such that additional candidate input cell(s) are added and therefore detected, then aspects of FIG. 2 (e.g. 202, 204, 206) are performed. For instance, a selection interface may again be presented to the user showing candidate cells (including the added input cell(s), any additional identified context cell(s) for those added input cell(s), and optionally prior candidate input/context cells), allowing the user to tailor the candidates and select those to present in the interface. Then, referring back to FIG. 4, based on detecting the cell(s) to add/remove to the interface based on the dependency graph change, the process continues by updating the additional interface/window (404).

Optionally, the candidate cells presented to the user for potential inclusion in the additional interface may include calculated cell(s) of the spreadsheet. Calculated cells may be identified in some examples as the sinks of the dependency graph. Context cell(s) associated with the calculated cells can also be identified, automatically and/or by user-selection, and displayed. These can be displayed in the added interface together with the input cell(s) and context cell(s) associated with those input cell(s). The calculated cells and corresponding context cell(s) may be automatically detected and presented to the user as candidates for inclusion (e.g. FIG. 2, #206) along with the input cell(s) and context cell(s) corresponding to those input cell(s). Additionally or alternatively, charts, graphs, or the like that are built based on calculated cells can be automatically or manually selected for inclusion in the interface.

Processes to facilitate interaction with a spreadsheet are thereby provided, an example of which is depicted and described with reference to FIG. 5. The process is performed by one or more computer systems executing the spreadsheet application, one or more computer systems in communication with one or more computer systems executing the spreadsheet application, or a combination of the foregoing.

The process begins by automatically detecting cell(s) of a spreadsheet displayed on a display device of a computer system (502). This includes automatically detecting input cell(s) of a spreadsheet. Automatically detecting the input cell(s) includes, as an example, ascertaining dependencies between cells of the spreadsheet. Ascertaining the dependencies includes, as an example, evaluating a dependency graph of the spreadsheet. The input cell(s) can be identified based on dependencies that other cells of the spreadsheet have on the input cell(s), the dependencies specifying the input cell(s) by reference for calculation(s). In some examples, the input cell(s) include self-contained constraints or formulas for the spreadsheet.

Automatically detecting the cell(s) (502) may also include automatically detecting context cell(s) corresponding to the input cell(s). The more context cell(s) may be automatically detected based on one or more of the following: (i) proximity to a detected input cell in the spreadsheet, (ii) absence from a dependency graph of the spreadsheet, and (iii) containing only text data. Furthermore, automatically detecting the cell(s) (502) may also include automatically detecting calculated (result) cell(s) of the spreadsheet.

Figure 5:
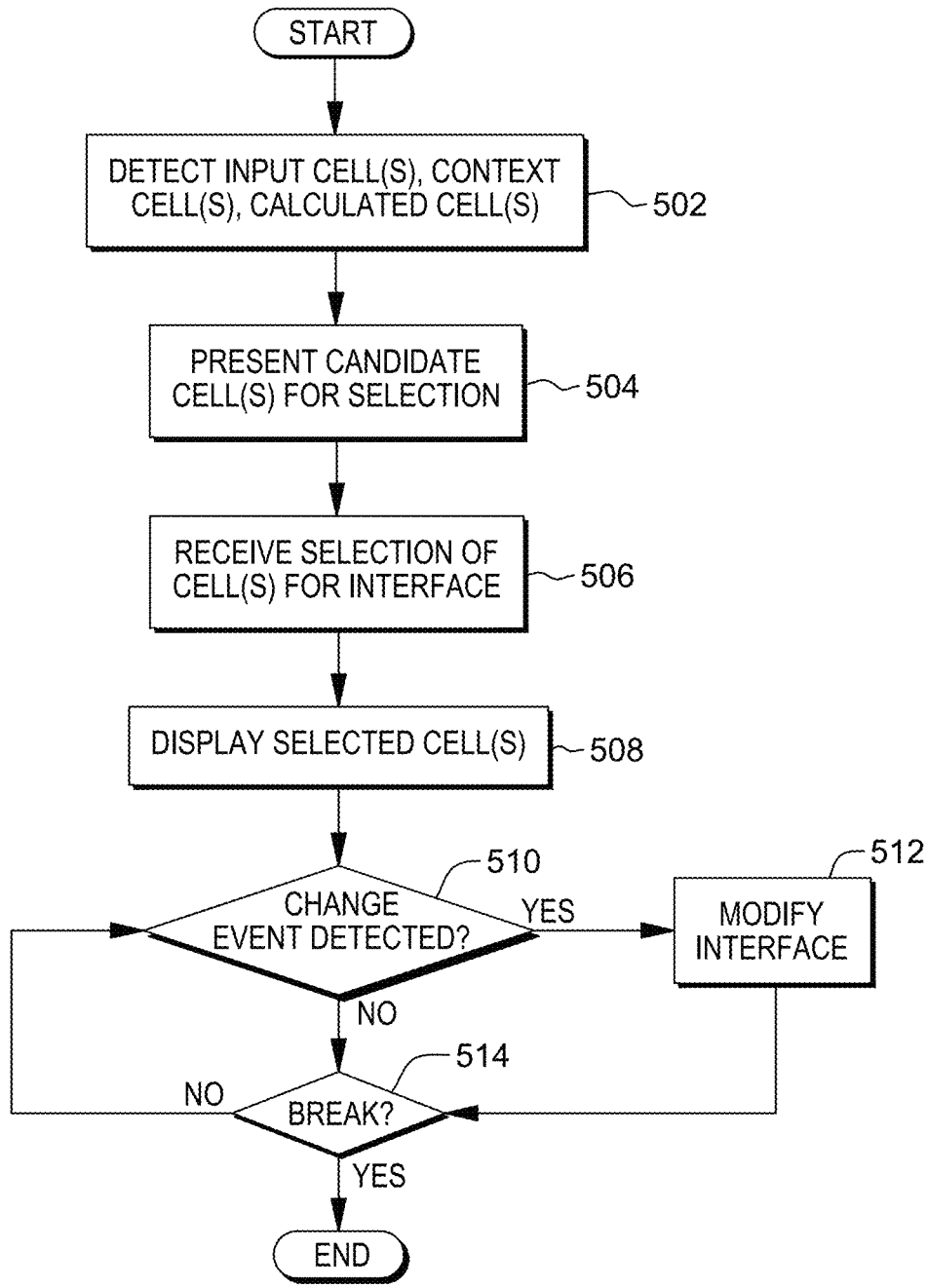
FIG. 5 depicts an example process to facilitate interaction with a spreadsheet, in accordance with aspects described herein.

The process of FIG. 5 continues by presenting for selection candidate cell(s) of the spreadsheet (504), i.e. as candidates for inclusion in an interface for display on the display device in conjunction with the spreadsheet. The candidates presented for selection can include all of the detected cells (502) or a proper subset of those detected cells. In this regard, processing may automatically determine one or more cells, of those detected, that are not to be presented as candidates. Thus, this presenting can include presenting each detected input cell of the input cell(s) along with a corresponding at least one context cell, of the detected context cell(s), that is proximate to the respective input cell to provide context for the respective input cell.

The process then receives a selection of at least one cell, of the candidate cell(s), for inclusion in the interface (506). In some embodiments, the process also receives a selection of other cell(s) of the spreadsheet for inclusion in the interface, the other cell(s) not included in the detected input cell(s) or detected context cell(s). Additionally or alternatively, the process also receives a selection of at least one calculated cell, of the calculated cell(s), for inclusion in the interface.

The selected at least one cell is then displayed in the interface (508). The selected at least one cell that is displayed includes at least one input cell of the candidate input cell(s), at least one context cell of the candidate context cell(s), and/or at least one calculated cell. Additionally, if the use selects other cell(s), they are displayed in the interface along with the selected at least one cell.

In some embodiments, the interface includes a movable floating window configured to float on top of at least a portion of the spreadsheet when the spreadsheet is displayed. The interface may be configured to receive input for each input cell of the at least one input cell input cell displayed, in order to edit a respective value for the input cell in the spreadsheet.

In some embodiments, the additional interface is responsive to changes in the spreadsheet, for instance changes in the dependency graph. Thus, the process of FIG. 5 continues by monitoring for an event indicating a change to one or more dependencies between cells of the spreadsheet in which a new input cell is added or an existing input cell is removed, and determining whether a change event is detected (510). If a change event is detected, the process modifies the interface (512) to add the new input cell to the interface or remove the existing input cell from the interface. In situations where the modifying adds the new input cell to the interface, the modifying may be performed based on a selection to add the new input cell to the interface together with a selection of one or more context cells to add to the interface for providing context for the added input cell.

After modifying the interface (512), or if no change event was detected, the process continues with a determination about whether to break (514). The process might break if the user chooses to close the interface or the spreadsheet, as examples. If it is determined to break, the process ends, otherwise the process loops back to (510) to determine whether a change event was detected.

Processes described herein may be performed singly or collectively by one or more computer systems, such as computer system(s) described below with reference to FIG. 6. Such a computer system may be executing a spreadsheet application for the particular spreadsheet involved, or may be a backend computer system communicating with the computer system executing the spreadsheet program. In some examples, aspects described herein are performed by a combination of the foregoing systems.

Figure 6:
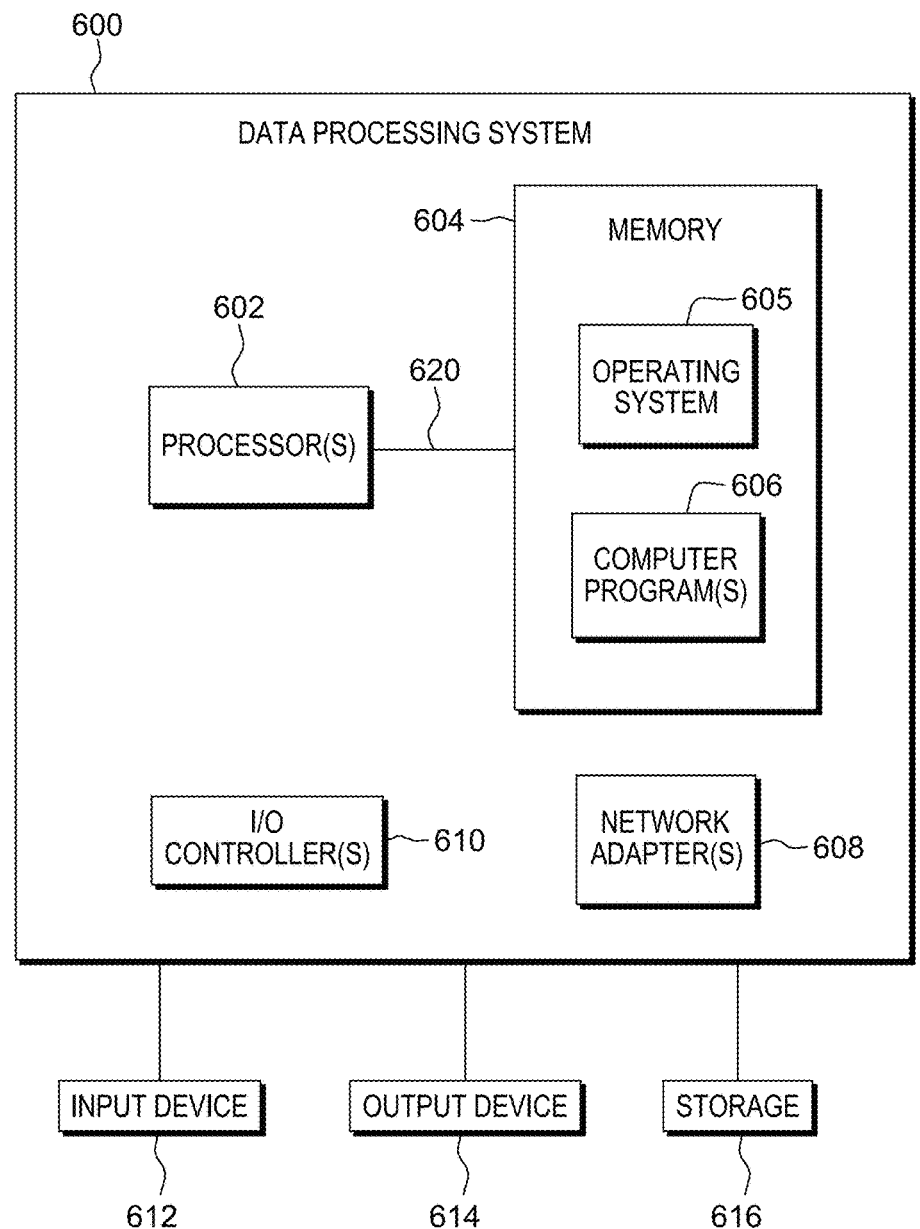
FIG. 6 depicts an example of a computer system to incorporate or use aspects described herein.

FIG. 6 depicts one example of a computer system to incorporate and use aspects described herein. A computer system may also be referred to herein as a processing device/system or computing device/system, or simply a computer. Computer system 600 may be based on one or more of various system architectures such as those offered by International Business Machines Corporation (Armonk, N.Y., USA) or Intel Corporation (Santa Clara, Calif., USA), as examples.

Computer system 600 is suitable for storing and/or executing program code and includes at least one processor 602 coupled directly or indirectly to memory 604 through, e.g., a system bus 620. In operation, processor(s) 602 obtain from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606, for instance programs to perform aspects described herein.

Input/Output (I/O) devices 612, 614 (including but not limited to displays, microphones, speakers, accelerometers, gyroscopes, magnetometers, light sensors, proximity sensors, GPS devices, cameras, etc.) may be coupled to the system either directly or through I/O controllers 610.

Network adapter(s) 608 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 608 used in computer systems.

Computer system 600 may be coupled to storage 616 (e.g., a non-volatile storage area, such as magnetic disk drives, optical disk drives, a tape drive, etc.), having one or more databases. Storage 616 may include an internal storage device or an attached or network accessible storage. Computer programs in storage 616 may be loaded into memory 604 and executed by a processor 602 in a manner known in the art.

The computer system 600 may include fewer components than illustrated, additional components not illustrated herein, or some combination of the components illustrated and additional components. Computer system 600 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 7:
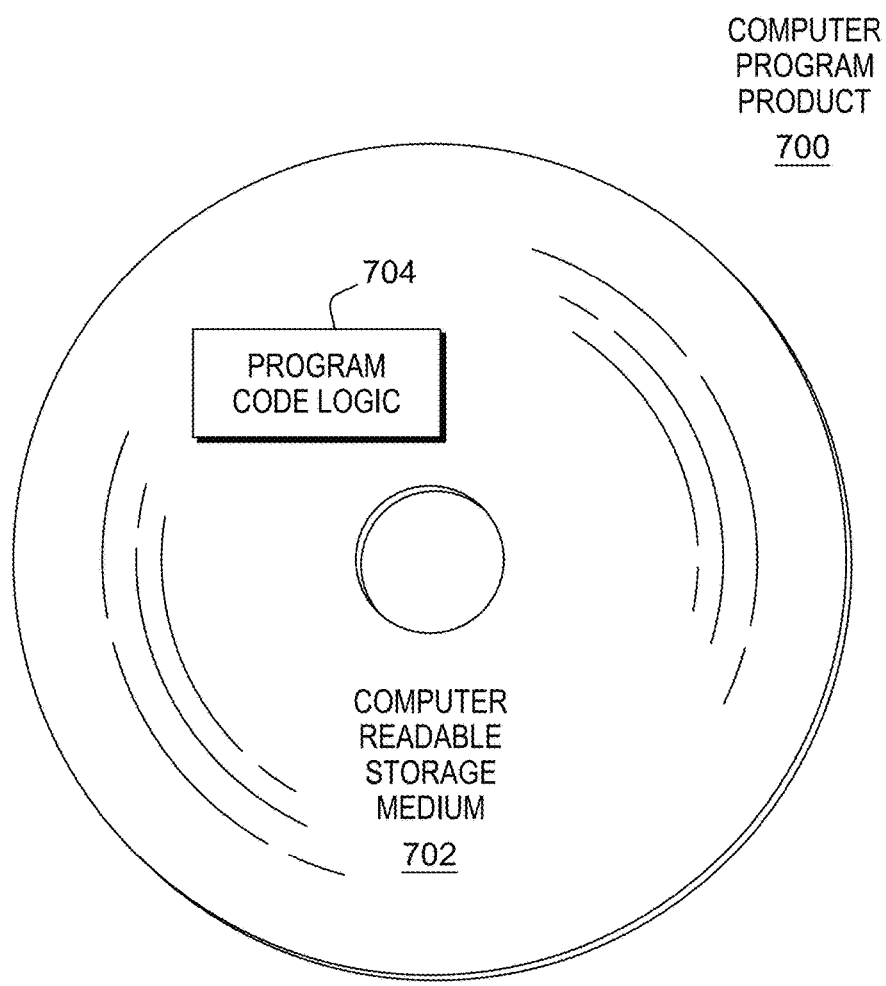
FIG. 7 depicts one embodiment of a computer program product.

Referring to FIG. 7, in one example, a computer program product 700 includes, for instance, one or more computer readable storage media 702 to store computer readable program code means, logic and/or instructions 704 thereon to provide and facilitate one or more embodiments.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
   a non-transitory computer readable storage medium readable by a processing circuit and storing instructions for execution by the processing circuit for performing a method for providing an input interface on a computer system, the method comprising:
      ascertaining, by the computer system, dependencies between cells of a spreadsheet displayed on a display device of the computer system, and automatically detecting, based on the ascertaining, one or more input cells of the spreadsheet;
      automatically detecting one or more context cells corresponding to the one or more input cells, the one or more context cells being automatically detected based on (i) proximity to a detected input cell in the spreadsheet, (ii) absence from a dependency graph of the spreadsheet, and (iii) containing only text data;
      based on the detecting the one or more input cells and the detecting the one or more context cells, automatically building and presenting, absent user intervention, a selection interface to a user of the computer system on the display device thereof, the selection interface including candidate cells of the spreadsheet as candidates for selection, by the user, to include in a separate input interface, separate from the selection interface, for display on the display device in conjunction with the spreadsheet, the candidate cells comprising the detected one or more input cells and further comprising the detected one or more context cells;
      receiving, from the user, a user selection of cells, of the candidate cells, for inclusion in the input interface, wherein the user selection selects cells comprises at least one input cell of the detected one or more input cells and at least one context cell of the detected one or more context cells, wherein the user selection is identified based on user-input to the presented selection interface, the user input comprising multiple manual selections by the user, wherein each manual selection of the multiple manual selections is for a respective individual cell of the user selection of cells, including the at least one input cell and the at least one context cell, using at least one input device to the computer system to provide the user-input, wherein the user selection is received based on the user interacting with the presented selection interface based on the automatically building and presenting the selection interface to the user; and
      based on the user selection, via the selection interface, of the cells for inclusion in the input interface, building the input interface to include the selected cells, including the at least one input cell and the at least one context cell, and displaying the input interface including the selected cells, wherein the selected cells comprise non-contiguous cells of the spreadsheet.

2. The computer program product of claim 1, wherein the input interface is configured to receive input for each input cell of the at least one input cell to edit a respective value for the input cell in the spreadsheet.

3. The computer program product of claim 1, wherein the method further comprises identifying, based on the ascertaining, the one or more input cells based on dependencies that other cells of the spreadsheet have on the one or more input cells, the dependencies specifying the one or more input cells by reference for one or more calculations.

4. The computer program product of claim 3, wherein the one or more input cells comprise self-contained constraints or formulas for the spreadsheet.

5. The computer program product of claim 3, wherein the ascertaining the dependencies comprises evaluating a dependency graph of the spreadsheet.

6. The computer program product of claim 1, wherein presenting the selection interface comprises presenting each detected input cell of the one or more input cells along with a corresponding at least one context cell, of the detected one or more context cells, that is proximate to the respective input cell to provide context for the respective input cell.

7. The computer program product of claim 1, wherein the method further comprises receiving from the user a selection of one or more other cells of the spreadsheet for inclusion in the input interface, the one or more other cells not included in the detected one or more input cells or detected one or more context cells, and displaying in the input interface the selected one or more other cells along with the selected cells.

8. The computer program product of claim 1, wherein the method further comprises automatically detecting one or more calculated cells of the spreadsheet, receiving from the user a selection of at least one calculated cell, of the one or more calculated cells, for inclusion in the input interface, and displaying in the input interface the selected at least one calculated cell along with the selected cells.

9. The computer program product of claim 1, wherein the method further comprises:
   monitoring for an event indicating a change to one or more dependencies between cells of the spreadsheet in which a new input cell is added or an existing input cell is removed; and
   based on the event, modifying the input interface to add the new input cell to the input interface or remove the existing input cell from the input interface.

10. The computer program product of claim 9, wherein the modifying adds the new input cell to the input interface, wherein the modifying is performed based on a selection by the user to add the new input cell to the input interface together with a selection by the user of one or more context cells to add to the input interface for providing context for the added input cell.

11. The computer program product of claim 1, wherein the selection interface and the input interface each comprises a respective movable floating window configured to float on top of at least a portion of the spreadsheet when the spreadsheet is displayed.

12. A computer-implemented method for providing an input interface on a computer system, the method comprising:
- ascertaining, by the computer system, dependencies between cells of a spreadsheet displayed on a display device of the computer system, and automatically detecting, based on the ascertaining, one or more input cells of the spreadsheet;
- automatically detecting one or more context cells corresponding to the one or more input cells, the one or more context cells being automatically detected based on (i) proximity to a detected input cell in the spreadsheet, (ii) absence from a dependency graph of the spreadsheet, and (iii) containing only text data;
- based on the detecting the one or more input cells and the detecting the one or more context cells, automatically building and presenting, absent user intervention, a selection interface to a user of the computer system on the display device thereof, the selection interface including candidate cells of the spreadsheet as candidates for selection, by the user, to include in a separate input interface, separate from the selection interface, for display on the display device in conjunction with the spreadsheet, the candidate cells comprising the detected one or more input cells and further comprising the detected one or more context cells;
- receiving, from the user, a user selection of cells, of the candidate cells, for inclusion in the input interface, wherein the user selection selects cells comprises at least one input cell of the detected one or more input cells and at least one context cell of the detected one or more context cells, wherein the user selection is identified based on user-input to the presented selection interface, the user input comprising multiple manual selections by the user, wherein each manual selection of the multiple manual selections is for a respective individual cell of the user selection of cells, including the at least one input cell and the at least one context cell, using at least one input device to the computer system to provide the user-input, wherein the user selection is received based on the user interacting with the presented selection interface based on the automatically building and presenting the selection interface to the user; and
- based on the user selection, via the selection interface, of the cells for inclusion in the input interface, building the input interface to include the selected cells, including the at least one input cell and the at least one context cell, and displaying the input interface including the selected cells, wherein the selected cells comprise non-contiguous cells of the spreadsheet.

13. The computer-implemented method of claim 12, wherein the input interface is configured to receive input for each input cell of the at least one input cell to edit a respective value for the input cell in the spreadsheet.

14. The computer-implemented method of claim 12, further comprising:
- monitoring for an event indicating a change to one or more dependencies between cells of the spreadsheet in which a new input cell is added or an existing input cell is removed; and
- based on the event, modifying the input interface to add the new input cell to the input interface or remove the existing input cell from the input interface.

15. A computer system comprising:
a memory; and
a processor in communication with the memory, wherein the computer system is configured to perform a method for providing an input interface on the computer system, the method comprising:
- ascertaining, by the computer system, dependencies between cells of a spreadsheet displayed on a display device of the computer system, and automatically detecting, based on the ascertaining, one or more input cells of the spreadsheet;
- automatically detecting one or more context cells corresponding to the one or more input cells, the one or more context cells being automatically detected based on (i) proximity to a detected input cell in the spreadsheet, (ii) absence from a dependency graph of the spreadsheet, and (iii) containing only text data;
- based on the detecting the one or more input cells and the detecting the one or more context cells, automatically building and presenting, absent user intervention, a selection interface to a user of the computer system on the display device thereof, the selection interface including candidate cells of the spreadsheet as candidates for selection, by the user, to include in a separate input interface, separate from the selection interface, for display on the display device in conjunction with the spreadsheet, the candidate cells comprising the detected one or more input cells and further comprising the detected one or more context cells;
- receiving, from the user, a user selection of cells, of the candidate cells, for inclusion in the input interface, wherein the user selection selects cells comprises at least one input cell of the detected one or more input cells and at least one context cell of the detected one or more context cells, wherein the user selection is identified based on user-input to the presented selection interface, the user input comprising multiple manual selections by the user, wherein each manual selection of the multiple manual selections is for a respective individual cell of the user selection of cells, including the at least one input cell and the at least one context cell, using at least one input device to the computer system to provide the user-input, wherein the user selection is received based on the user interacting with the presented selection interface based on the automatically building and presenting the selection interface to the user; and
- based on the user selection, via the selection interface, of the cells for inclusion in the input interface, building the input interface to include the selected cells, including the at least one input cell and the at least one context cell, and displaying the input interface including the selected cells, wherein the selected cells comprise non-contiguous cells of the spreadsheet.

16. The computer system of claim 15, wherein the input interface is configured to receive input for each input cell of the at least one input cell to edit a respective value for the input cell in the spreadsheet.

17. The computer system of claim 15, wherein the method further comprises:
- monitoring for an event indicating a change to one or more dependencies between cells of the spreadsheet in which a new input cell is added or an existing input cell is removed; and based on the event, modifying the input interface to add the new input cell to the input interface or remove the existing input cell from the input interface.

* * * * *